US012681206B2

(12) United States Patent
Edwards et al.

(10) Patent No.: US 12,681,206 B2
(45) Date of Patent: Jul. 14, 2026

(54) AUGMENTING CLIMATE IMPACT AND HAZARD MODELS

(71) Applicant: INTERNATIONAL BUSINESS MACHINES CORPORATION, Armonk, NY (US)

(72) Inventors: Blair Nicholas Victor Edwards, Manchester (GB); Paolo Fraccaro, Warrington (GB); Anne Jones, Rainford (GB); Komminist Weldemariam, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 1011 days.

(21) Appl. No.: 17/883,087

(22) Filed: Aug. 8, 2022

(65) Prior Publication Data

US 2024/0045099 A1 Feb. 8, 2024

(51) Int. Cl.
*G01V 20/00* (2024.01)
*G01W 1/10* (2006.01)

(52) U.S. Cl.
CPC .............. *G01V 20/00* (2024.01); *G01W 1/10* (2013.01); *G01W 2201/00* (2013.01)

(58) Field of Classification Search
CPC ..... G01V 20/00; G01W 1/10; G01W 2201/00
USPC .......................................................... 703/6
See application file for complete search history.

(56) References Cited

U.S. PATENT DOCUMENTS 10,521,863 B2 12/2019 Stoner, Jr.
10,909,446 B2 2/2021 Tocornal 2014/0278294 A1* 9/2014 Yeager .................... G06F 30/20
703/22
2016/0196513 A1 7/2016 Mallon
2019/0018918 A1* 1/2019 Wood ...................... G06F 17/18
2020/0372349 A1 11/2020 Gaitan Ospina
2021/0041598 A1 2/2021 Tocornal
2021/0053418 A1 2/2021 Kale (Continued)

FOREIGN PATENT DOCUMENTS

WO 2020113305 A1 6/2020

OTHER PUBLICATIONS

Cloke, Hannah L., et al. "Modelling climate impact on floods with ensemble climate projections." Quarterly Journal of the Royal Meteorological Society 139.671 (2013): 282-297. (Year: 2013).*

(Continued)

*Primary Examiner* — John E Johansen

(74) *Attorney, Agent, or Firm* — Monchai Chuaychoo

(57) ABSTRACT

Concepts are proposed for augmenting a plurality of climate impact and hazard models. In particular, the plurality of climate impact and hazard models are modified/altered based on a user-specified requirement (i.e., a specified geographical location, temporal location or hazard type) and at least one intelligent (i.e., AI-enabled) workflow. Each modified climate impact and hazard model is then analyzed/ processed using a machine learning model to identify model parameters which may improve the climate impact and machine learning model. An operation is then identified and executed based on the intelligent workflow, and model parameter. In this way, speed, efficiency and accuracy of climate impact and hazard models may be improved at scale.

19 Claims, 13 Drawing Sheets

(56) References Cited

U.S. PATENT DOCUMENTS

2021/0287459 A1    9/2021  Cella
2024/0104401 A1*   3/2024  Dembo ............. G06Q 10/0635

OTHER PUBLICATIONS

Mattmann, Chris A., et al. "Cloud computing and virtualization within the regional climate model and evaluation system." Earth Science Informatics 7.1 (2014): 1-12. (Year: 2014).*
"Open Climate Impacts Modelling Framework", DAFNI, Printed Jul. 21, 2022, 5 pages, <https://dafni.ac.uk/openclim/>.
Abe et al., "AI for climate mitigation, adaptation, and environmental justice", Fragile Earth 2022, AI Good,5 pps., https://ai4good.org/fragile-earth-2022/>.
Ishikawa et al., "A geospatial and temporal analytics framework for flood risk mapping", Proceedings of the EGU General Assembly 2021, Online Conference, Apr. 19-30, 2021, 1 page, <https://meetingorganizer.copernicus.org/EGU21/EGU21-14064.html>.
Mell et al., "The NIST Definition of Cloud Computing", National Institute of Standards and Technology, U.S. Department of Commerce, NIST Special Publication 800-145, Sep. 2011, 7 pages.
Singhal et al., "IFM: A Scalable High Resolution Flood Modeling Framework", Proceedings of the Euro-Par 2014 Parallel Processing—20th International Conference, Porto, Portugal, Aug. 25-29, 2014, 13 pages, <https://www.researchgate.net/publication/267213977_IFM_A_Scalable_High_Resolution_Flood_Modeling_Framework>.

* cited by examiner

AUGMENTING CLIMATE IMPACT AND HAZARD MODELS

BACKGROUND

Understanding and quantifying the impacts of climate change on human and natural systems is facilitated by climate impact and hazard modelling. Climate impact and hazard modeling involves deploying and integrating models having a variety of forms (e.g., simulation/physics-based, data-driven/statistical, rules-based/empirical) in order to translate weather and climate related variables, such as rainfall, temperature, and sea level, to climate hazards, such as flooding and drought,) and their consequences (e.g., disruptions to energy or agricultural productivity).

Climate impact and hazard model pipelines are typically bespoke and developed for a particular use-case. Substantial effort is usually required in order to curate the input data, deploy the models, and post-process the outputs. The individuality of climate impact and hazard model pipelines is due to the unique challenges encountered when working with spatiotemporal datasets from a range of sources. The issue is often exacerbated by the size of such datasets, which grow larger with increasing spatial and temporal resolution.

A further challenge lies in scaling climate impact and hazard models to account for uncertainty, which requires models to be run with multiple iterations of driving datasets (e.g., different climate impact and hazard models with different parameter settings), and for the uncertainty space of the climate impact and hazard models themselves to be explored.

Currently, many supporting elements exist for climate impact and hazard modelling, such as approaches, tools, and frameworks. The supporting elements mostly focus on enabling climate change related risk analysis using open domain climate models and offer curated industry-specific analytic services addressing specialized needs for climate change adaptation in key industries, such as insurance, banking, asset management, real estate, supply chain, oil and gas, and public sector. The solutions lack the capability for integration into enterprise process offerings for facilitating decision making (e.g., asset management, supply chain, infrastructure operations).

Presently there is not a generalized, configurable and AI-enabled (artificial intelligence-enabled) modelling framework having the ability to scale (e.g., spatially, temporally) climate impact and hazard models according to user-specified requirements.

SUMMARY

The present invention seeks to provide a method for augmenting a plurality of climate impact and hazard models. Such a method may be computer-implemented. That is, such methods may be implemented in a computer infrastructure having computer executable code tangibly embodied on a computer readable storage medium having programming instructions configured to perform a proposed method. The present invention further seeks to provide a system for augmenting a plurality of climate impact and hazard models.

According to an aspect of the present invention there is provided a computer-implemented method for augmenting a plurality of climate impact and hazard models, the method provides for one or more processors modifying the plurality of climate impact and hazard models based on a user-specified requirement and at least one intelligent workflow. The one or more processors identifying, for each of the modified plurality of climate impact and hazard models, at least one model parameter associated with the modified climate impact and hazard model, by processing the modified climate impact and hazard model with a model enhancing machine learning (ML) model. The one or more processors determining, for each of the plurality of modified climate impact and hazard models, at least one operation based on the user-specified requirement, the at least one intelligent workflow, and the at least one model parameter corresponding to the modified climate impact and hazard model, and the one or more processors executing, for each of the plurality of modified climate impact and hazard models, the at least one operation corresponding to the modified climate impact and hazard model based on the at least one intelligent workflow.

According to another aspect of the invention, there is provided a system for augmenting a plurality of climate impact and hazard models, the system comprising a modelling unit configured with programming instructions to modify the plurality of climate impact and hazard models based on a user-specified requirement and at least one intelligent workflow; a model analysis unit configured with programming instructions to identify, for each of the plurality of modified climate impact and hazard models, at least one model parameter associated with the modified climate impact and hazard model, by processing the modified climate impact and hazard model with a model enhancing machine learning model; an operation identification unit configured with programming instructions to determine, for each of the plurality of modified climate impact and hazard models, at least one operation based on the user-specified requirement, the at least one intelligent workflow, and the at least one model parameter corresponding to the modified climate impact and hazard model; and a model adaptation unit configured with programming instructions to execute, for each of the plurality of modified climate impact and hazard models, the at least one operation corresponding to the modified climate impact and hazard model based on the at least one intelligent workflow.

The above and other aspects of the invention will be apparent from and elucidated with reference to the embodiment(s) described hereinafter.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figures 1A, 1B:
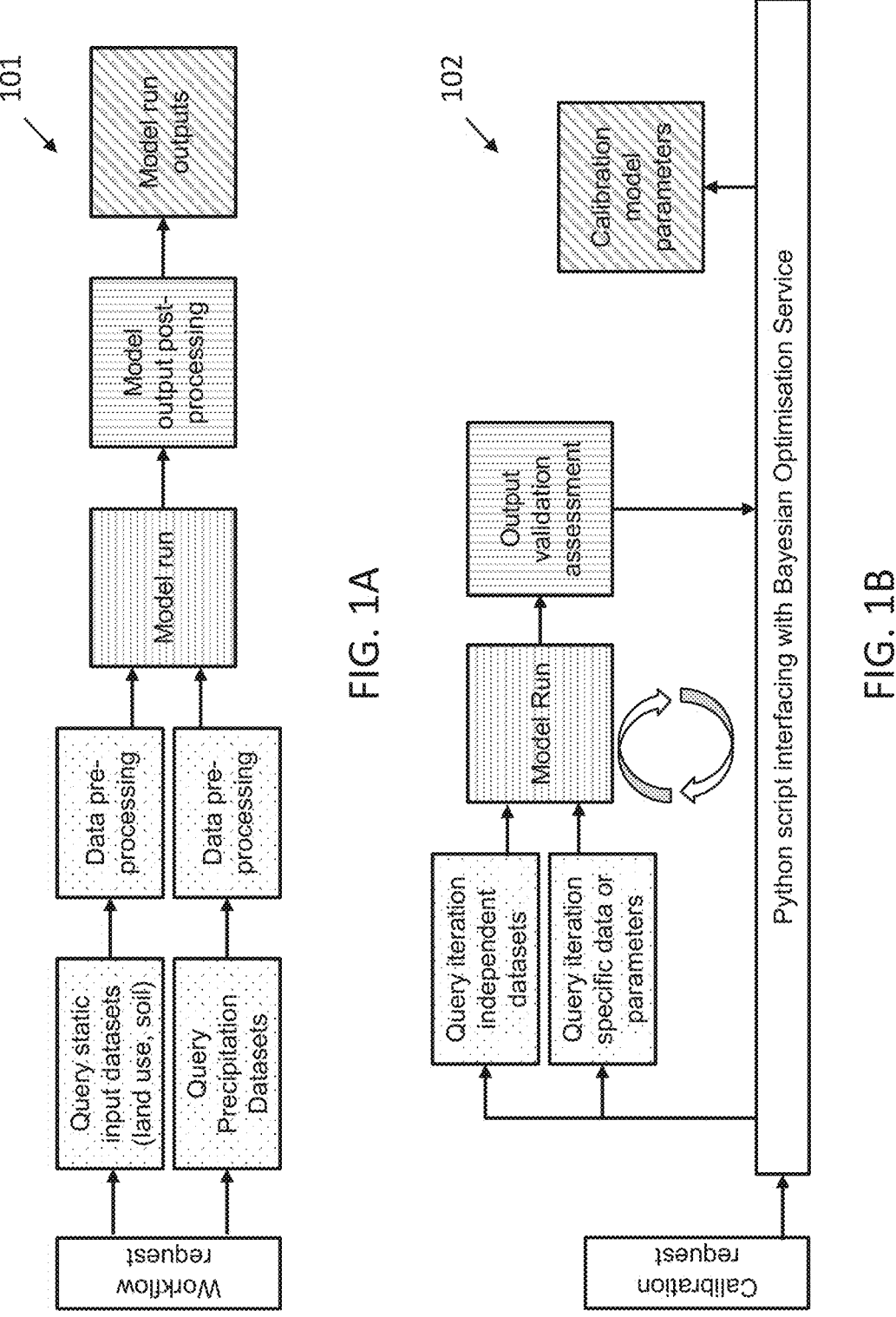
FIGS. 1A-1D present block diagrams of example intelligent workflows for climate impact and hazard models, according to an aspect of the invention.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. If the term "adapted to" is used in the claims or description, it is noted the term "adapted to" is intended to be equivalent to the term "configured to".

In the context of the present application, where embodiments of the present invention constitute a method, it should be understood that such a method may be a process for execution by a computer, i.e., may be a computer-implementable method. The various steps of the method may therefore reflect various parts of a computer program, e.g., various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

Implementations in accordance with the present disclosure relate to various techniques, methods, schemes and/or solutions pertaining to for augmenting a plurality of climate impact and hazard models. In particular, the plurality of climate impact and hazard models are modified/altered based on a user-specified requirement (i.e., a specified geographical location, temporal location, or hazard type) and at least one intelligent workflow, such as an AI-enabled workflow. Each modified climate impact and hazard model is then processed/analyzed using one or more machine learning models to identify model parameters which may improve the climate impact and machine learning models. An operation is then identified and executed based on the intelligent workflow, and model parameters. In this way, speed, efficiency and accuracy of climate impact and hazard models may be improved at scale.

Put another way, the climate impact and hazard models are changed by use of a model enhancing machine learning model (i.e., machine learning algorithm), and intelligent workflows. Specifically, model-enhancing parameters are identified by the model enhancing machine learning model, which may then be altered by an operation executed for each of the modified climate impact and hazard models. Thus, a generalizable means for accelerating an on-boarding process of multiple climate impact and hazard models for the needs of a user is provided.

The modification (i.e., on-boarding, scaling, localizing, managing, etc.) of each of the plurality of climate impact and hazard models, such that they are aligned with a user specified requirement, provides a first step in augmenting the climate impact and hazard models. The modification of the climate impact and hazard models is performed by leveraging intelligent workflows, which is achieved by splitting the climate change and impact model into a sequence of operations according to an appropriate workflow for the climate impact and hazard model.

A modified climate impact and hazard model may subsequently be processed by a model enhancing machine learning model (i.e., AI-based model). The processing enables model-enhancing parameters to be identified, which may improve the execution speed, efficiency and accuracy of the climate impact and hazard model.

By way of explanation, climate change has increased the need for understanding and quantifying consequences of climate-related events on natural and socioeconomic systems, and thus has increased the use of climate impact and hazard modelling. Climate impact and hazard modelling involves deploying and integrating models in a variety of forms to translate weather and climate variables to climate hazards and their consequences.

To be broadly applicable, climate impact and hazard models need to be able to be driven by spatial-temporal climate datasets and static geospatial datasets in a variety of forms (i.e., different sources, formats, resolutions, projections, and for climate datasets, different prediction timescales) in order to provide the most accurate outputs for any given location and time period.

It is also important to be able to systematically validate climate impact and hazard models predictions against real world observations. Typically, climate impact and hazard models require time-consuming calibration and/or post-processing to tune them to local conditions and correct for systematic biases. Climate impact and hazard models involve substantial uncertainties, and these uncertainties need to be quantified and propagated through model predictions Temporal and spatial targets and their associated computational requirements for modelling can be hugely variable depending on the end user and, therefore, modelling pipelines need to be scalable to meet the needs of the end user.

Climate impact and hazard model pipelines are usually bespoke and created by researchers working on one particular domain of application (e.g., hydrologists, crop modelers).

There is lack of automation, and therefore selection of best climate datasets, calibration of models, and validation/post-processing methods is normally carried out manually for a given use case and target location/time periods. Further, there is very little (or often no) use of artificial intelligence to increase accuracy, speed and scalability of climate impact and hazard models.

Accordingly, the process of creating modelling pipelines is slow and laborious, and often fragmented. Operation of climate impact and hazard models for large geographic areas, or at high temporal resolution is slow (and oftentimes unfeasible). As such, new predictions cannot be easily and quickly generated in response to the generation of new datasets.

In addition to the above issues and challenges, new climate impact and hazard models cannot be easily and quickly taken into consideration for predictions without substantial effort/modification of existing systems.

Moreover, due to the current manual (and hence non-optimal) nature of the choices (both data input and methodological choices) that are made in calibrating and operating climate impact and hazard models, predictions are highly limited in accuracy. As such, current predictions may not be trusted, which is not helped by a lack of adequate validation and uncertainty quantification of climate impact and hazard models. Further, more complex tasks such as assessment of risks across multiple hazards are unfeasible.

Therefore, there exists a need for a generalized, configurable and AI-enabled modelling framework to accelerate on-boarding, managing, scaling, and consolidating/unifying a plurality of climate impact and hazard models guided by intelligent workflows. Such a framework may enable the ability to scale climate impact and hazard models, such as scaling spatially, temporally, and for various output prediction types, according to user-specified requirements (e.g., super resolution, compound risk).

Artificial intelligence (AI)/machine learning (ML) applied across different operations that may be performed on climate impact and hazard models (such as calibration, uncertainty quantification, validation, localization, scaling, etc.) may be utilized to improve the quality of climate impact and hazard models upon on-boarding. For example, automated pipelines may prove advantageous for AI-based calibration, localization and validation of models, and historical hazard exposure.

Further, the storing, tracing, processing, exporting, and integrating outputs of climate impact and hazard models into enterprise workflows is vitally important.

Embodiments of the present invention may provide a generalizable framework that enables the rapid on-boarding, localized tuning and deployment of a climate impact and hazard model either individually or in combination with other climate impact and hazard models (which may have a different geospatial, temporal or hazard-based focus). In turn, this allows climate impact and hazard models to be deployed quickly and at scale for prediction at any location in space and time where data exists, thus taking advantage of hybrid cloud computing architecture.

Furthermore, embodiments of the present invention utilize AI in different stages, from intelligent workflow automation to AI-accelerated calibration (in terms of parameter improvement discovery), on-demand production of ground truth maps for performance estimation, and uncertainty quantification.

Embodiments may use an ontology and flexible interchange layer that grant the ability to store, process, and export climate impact and hazard models, output from the climate impact and hazard models, and workflows in isolation or in combination with one another.

Embodiments of the present invention provide concepts for accelerating climate impact and hazard modelling according to user-specified and/or learned requirements. Embodiments may provide an AI-enabled configurable modelling framework to accelerate on-boarding, managing, and scaling a plurality of climate impact and hazard models. Specifically, one or more model enhancing parameters are identified using machine learning models (as well as ontologies and knowledge graphs) in order to improve a given climate impact and hazard model. At least one operation (i.e., calibration, uncertainty quantification, validation, localization, scaling, etc.) may be determined for climate impact and hazard models, based on the one or more model enhancing parameters and user-specified requirements. The operations may then be executed to improve the quality of the climate impact and hazard models. In some embodiments, the operations may be performed by pre-built AI/ML models. Ultimately, in some embodiments, the modified climate impact and hazard model may be stored on the framework on a hybrid cloud environment (e.g. Red Hat® OpenShift, Red Hat and OpenShift are registered trademarks of Red Hat Inc., now a subsidiary of the IBM Corporation, in the U.S. and other countries world-wide).

The plurality of climate impact and hazard models may include models of floods, wildfires, droughts, extreme rainfalls, heat/cold wave, etc. Each of these may have different types, forms, geographic/time focus, follow different semantics, and may be built by different entities, etc.

The accelerator framework may be built in a hybrid cloud environment. AI/ML models and dynamically generated workflows (according to different user-specified or inferred requirements) may be used to accelerate both climate impact and hazard model development and execution. The AI/ML models may comprise physics-based and data-driven models which translate climate variables (e.g., temperature, precipitation, wind) and non-climate factors (e.g., land use, topography and soil properties) to a plurality of climate hazards (e.g., floods, droughts, wildfire), which can significantly impact socio-economic systems.

Embodiments of the proposed invention may include the following advantageous aspects:

(i) Leveraging and enhancing intelligent (AI-enabled) workflows to accelerate the onboarding, consolidation and deployment of uncertainty-aware climate impact and hazard models by providing geospatial data interfaces, pre-processing, post-processing, validation tools, and intelligent workflow generation capabilities for scalable deployment of climate impact and hazard models on a hybrid cloud environment.

(ii) Embedding tools which deploy AI methods to improve model accuracy, performance, relevance, and coverage of climate impact and hazard models (e.g., by automated calibration of model parameters against AI-detected ground truth) and uncertainty quantification (e.g., by learning the joint distribution of climate driver and impact model uncertainty).

(iii) Scaling of climate impact and hazard models at least across three dimensions using machine learning models, including: scaling spatially to any geographic region, scaling temporally to different time horizons/periods whether this is in the past, present or future, and scaling to different types of risks such as wildfire, droughts, and storms.

(iv) Configuration of scaling parameters based on user-specified requirements (or inferred parameters) at run-time, based on a given context while allowing users to interact with the accelerator framework using interactive workflows.

(v) The provision of intelligent (e.g., AI-enabled) workflows that enable the creation of flexible, compartmental, and intelligent data-driven climate impact and hazard model workflows.

(vi) The dynamic composition of workflows based on historical or forecast analysis for individual and combined climate impact and hazard models, as well as using analysis of previous workflows.

(vii) The iterative calibration of workflows.

(viii) Using data and model ontology and knowledge graphs to enable aggregation and consolidation of the plurality of climate impact and hazard models.

(ix) Dynamic curation and localization of climate impact and hazard models through intelligent calibration (e.g., by Bayesian Optimization and intelligent exploration of parameters space) combined with use of AI models to create ground truth, in order to localize/calibrate the climate impact and hazard model to a specific area or geography.

(x) Using intelligent parallelization across spatial and temporal domains to scale climate impact and hazard models and predictions across different geographies, time horizons and climate-related risks based on user requirements.

(xi) Enabling an AI-driven identification of climate impact and hazard models, associated driving datasets, and workflows for a given user requirement and/or spatiotemporal domain.

(xii) Using data from machine learning surrogate models (i.e., AI/ML equivalent of simulation climate impact and hazard models that can be run faster, and at lower computational price), to speed up execution and expand in a spatial-temporal domain. The surrogate models may be trained using simulation-driven data and observations.

(xiii) Calculation of climatological risk and assessment of uncertainty in ensemble forecasts using historical event simulations, as a parallel ensemble.

(xiv) Providing a programing interface to enable automated integration of climate impact and hazard model outputs and risk metrics with enterprise processes or workflows to enable decision making.

(xv) Using ontologies and flexible interchange layers enable storage and exporting of climate impact and hazard models, outputs, and workflows in isolation and in combination with one another.

Figures 1C, 1D:
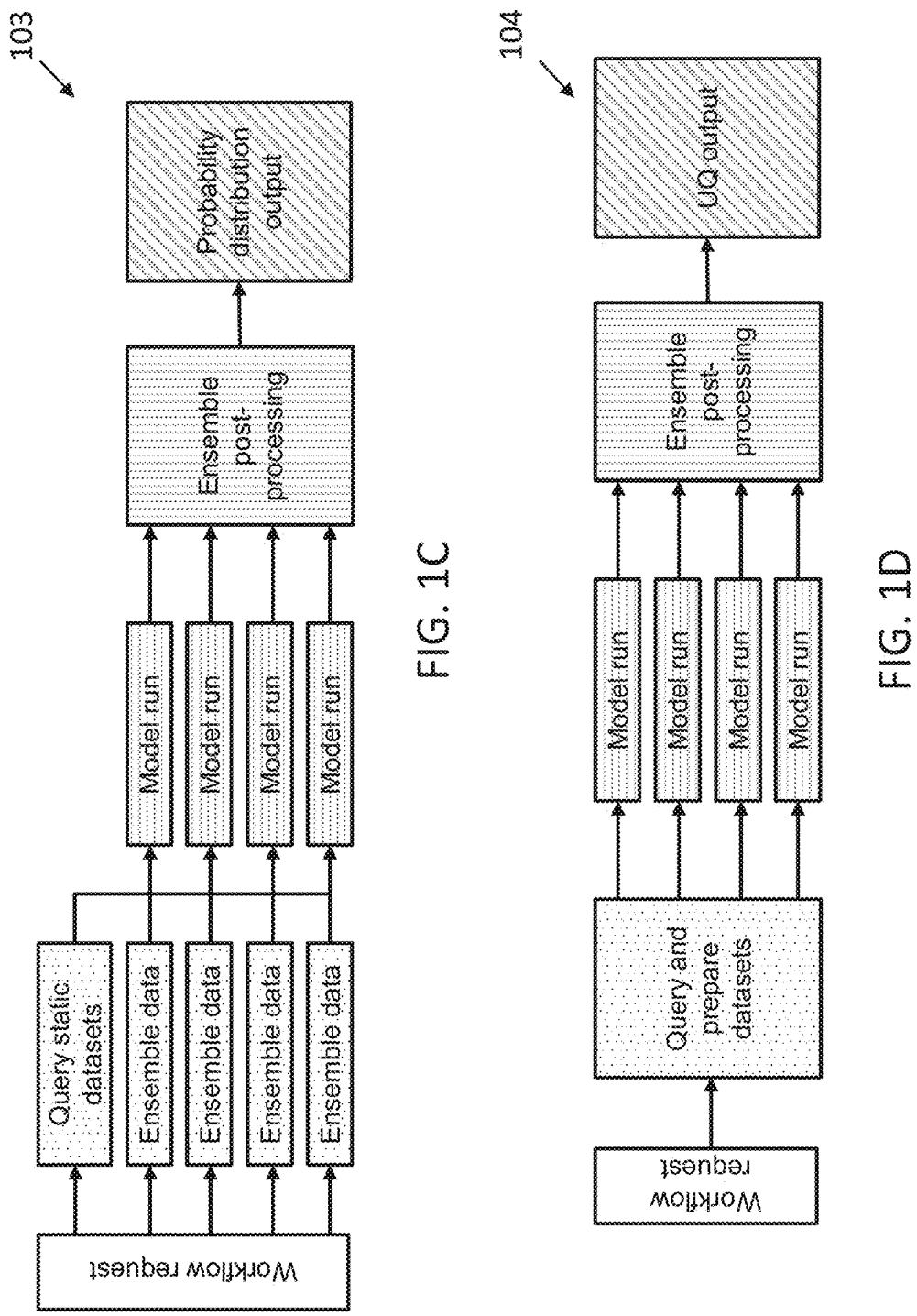

Turning now to FIGS. 1A-1D, a number of exemplary intelligent (AI-enabled) workflows are presented. Specifically, FIG. 1A presents a workflow for a single model run 101, FIG. 1B presents a workflow for a calibration run 102. Further, FIG. 1C presents a workflow for a climatology/ forecast ensemble 103, and FIG. 1D presents a workflow for a parameter ensemble 104.

Common to each workflow are query (blank), pre-processing (dotted), modelling (horizontal lines), post-processing (vertical lines), and output (diagonal lines) stages. Diagrams 1A-1D represent how similar stages can be differently arranged for different operations, in this way, the method of execution of a climate impact and hazard model may be considered modular.

According to an aspect of some embodiments of the invention, modularized AI-enabled/intelligent workflows are provided, having a standard interface to allow straightforward and flexible composition of different types of workflows for a single climate impact and hazard model, depending on the specific use-case. FIGS. 1A-1D shows four example configurations of workflow for a climate impact and hazard model where query, pre-processing, modelling, and post-processing modules can be deployed. In some more complex embodiments, iterative calibration of the intelligent workflows is performed to improve suitability for a given operation.

Figure 2:
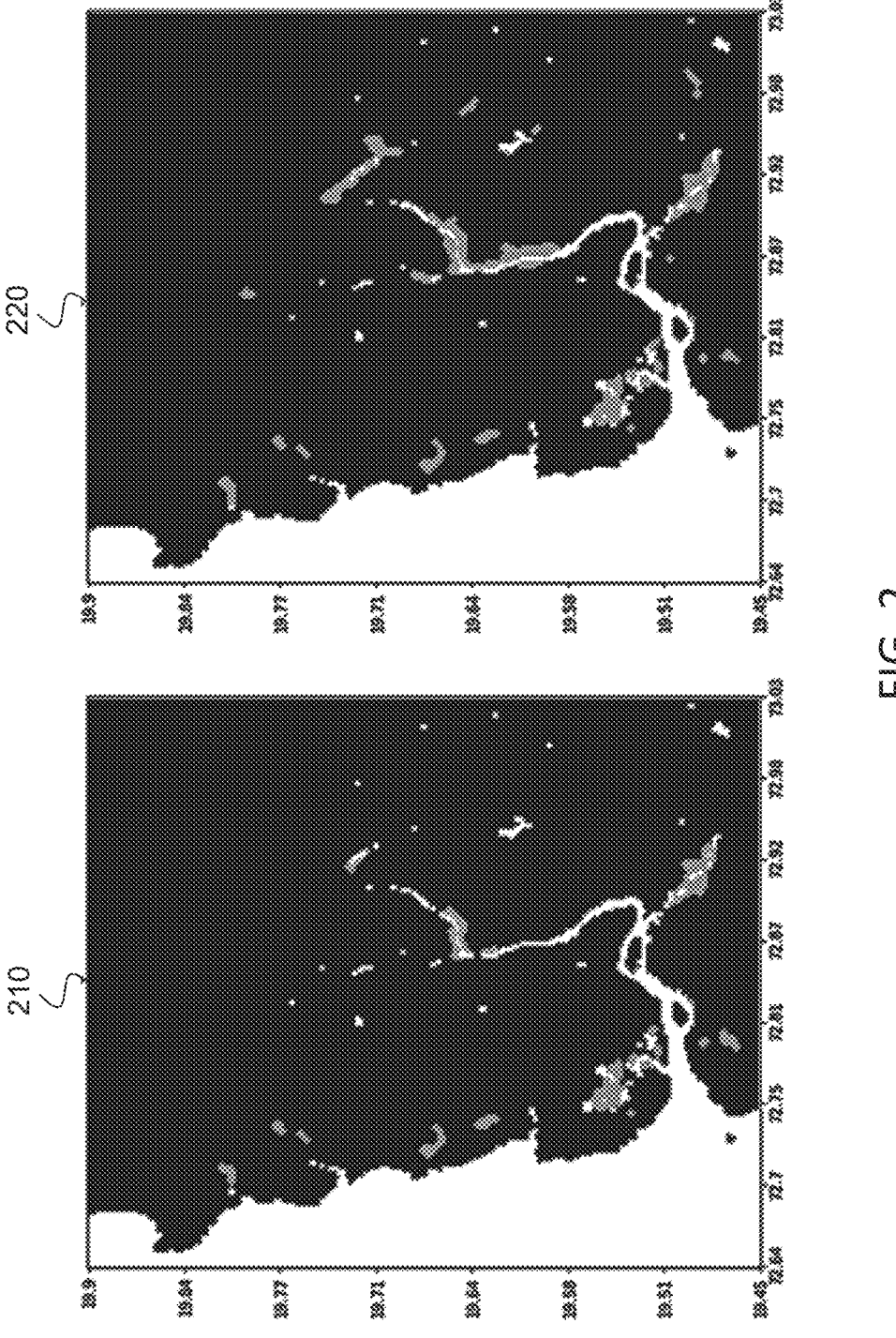
FIG. 2 presents a ground-truth (target) output of a flooding model, and an actual output of the flooding model, according to an aspect of the invention.

As an illustrative embodiment, FIG. 2 presents AI-derived ground truth (target) data 210 derived for a flooding prediction model, and actual output data 220 of a climate impact and hazard model. These may be used for a model calibration run of the climate impact and hazard (flood) model (e.g., a pluvial flood model using an impact fluvial model). The comparison of the climate impact and hazard model output 220 with dynamically generated AI-derived ground truth 210 (from remote-sensing data), for a user-specified region and time domain, may be used to calibrate the climate impact and hazard model.

The automation and scalability built into the framework provided by embodiments of the invention abstracts the technical challenges, such that they may not be known to an end-user. The exploration of the parameter space in the calibration may be accelerated through the adoption of an optimization engine (e.g., Bayesian Optimization) and through parallelization of model runs across batches of candidate model-improving parameters. Subsequently, the locally calibrated model (that may be validated according to a local historical event), with best-fit parameters is catalogued. The locally calibrated climate impact and hazard model may be utilized for carrying out forecast or climatological risk mapping for the region specified by the user.

Figure 3:
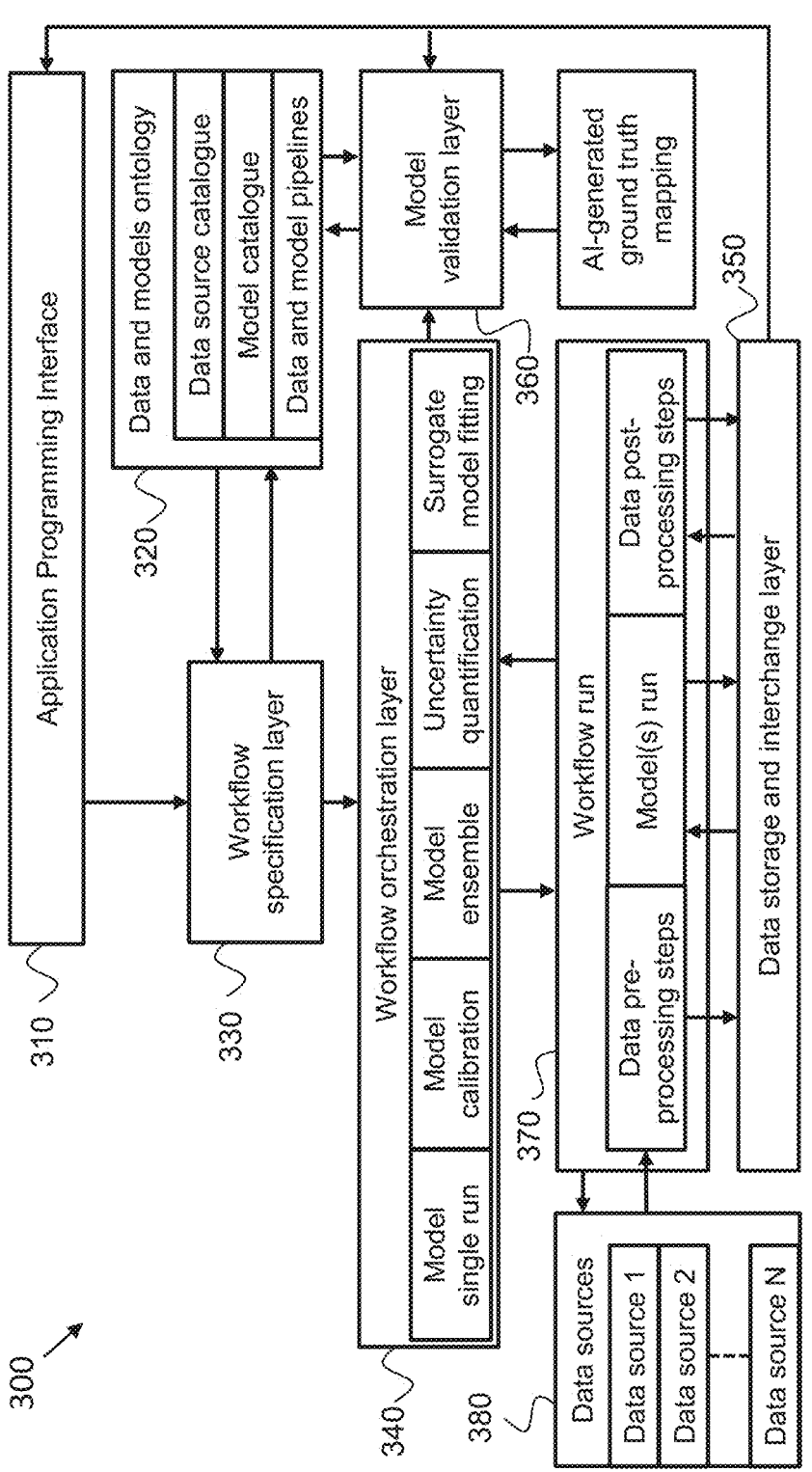
FIG. 3 is a block diagram of a system that may enable the deployment of different types of uncertainty-aware AI-powered climate impact and hazard models, according to an aspect of the invention.

A potential embodiment of the invention is presented as a block diagram of a system 300 in FIG. 3. The system 300 may enable the deployment of different types of uncertainty-aware AI-powered climate impact and hazard models using modular components to execute historical, climatological and forecast workflows at scale.

Primarily, the system 300 may provide a framework in which each possible type of climate impact and hazard modelling workflow comprises a number of modularized and customizable steps (which may be implemented in the form of containers) and processed based on intelligent workflow specification instructions provided by the user.

More particularly, the system 300 comprises the following:

(i) An application programming interface (API) 310. The user on-boards new data sources and models, submits workflows and receives the results through the endpoint of the API 310.

(ii) A data and models ontology 320. The ontology is one of the core components of the system 300 and contains a catalogue of data sources and climate impact and hazard models the user can select. Each workflow component in the registry may be represented by a single container image. The ontology 320 not only contains a catalogue of available data sources and impact models but also the relationship between them (e.g., in which climate impact and hazard model a data source could be used and vice versa, including spatiotemporal information).

(iii) Framework workflow modules (not shown). This may include an impact model, query data from different sources, pre-process data for input into models, or post-process model outputs (e.g., file type conversion or metric calculation). The module code is then provided in a common interface for the wider framework to ensure the automated set up of the module environment, the retrieval of input datasets, and the upload of module outputs. The modules can be executed either individually or orchestrated (with a workflow engine).

(iv) Workflow specification layer 330. The user provides the workflow specification (i.e., a user-specified requirement) having the details about the climate impact and hazard model they want to run. This may be in the form of a j son (JavaScript Object Notation) file, for example, and be provided via the application programming interface (API) 310, and contains information about: the type of analysis to run, for which geographical area and time period, any additional/customized pre-processing or post-processing steps, time and spatial resolution, etc.

(v) Workflow orchestration layer 340. This module uses AI and intelligent automation to optimize computational efficiency, performance and run time for each intelligent workflow. The layer 340 may have a range of different types of intelligent workflows, among which a user will be able to select via the workflow specification file. For example, the workflows may include a model single run, model calibration, model ensemble, uncertainty quantification, and model surrogate fitting. Based on the workflow specification requirements (i.e., user-specified requirements), the workflow orchestration layer 340 spreads the different tasks and jobs, intelligently parallelizing modelling across different time periods and geospatial areas (e.g., partitioning data by time and space). In case of a calibration workflow, AI is used to sample the parameter space more quickly and efficiently (e.g., using Bayesian optimization), to avoid wasting time on trying parameters combinations that would not work.

(vi) Data storage and interchange layer 350. This is the data layer where all the temporary data is stored during the workflow run, and then exposed to the user after the workflow is completed. This can be on the cloud or stored locally to accommodate different users and organization requirements.

(vii) Model validation layer 360 includes the calculation of climate impact and hazard model performance against ground truth data from historical events. The calculation may be achieved by utilizing an existing ground truth dataset or by dynamically generating ground truth for the specific area and time period of a model workflow using an AI model for the specific impact of interest (e.g., 210 of FIG. 2). Such models are stored and retrieved from the data and models ontology 320. The model validation layer 360 may be utilized in combination with different intelligent workflows. For example, it may be used as part of the calibration run to calculate performance metrics that allow the climate impact and hazard model parameters to be updated and improved.

(viii) A workflow run 370. This is the actual run of the climate impact and hazard model as according to the workflow orchestrated and scheduled by the workflow orchestration layer 340. In general, this will be composed of three main steps:

(a) Data pre-processing. The data to run the workflow is loaded for the desired time and location from the relevant data sources 380. The data is pre-processed according to the instructions provided by the user (e.g., as per data sources catalogue or workflow specification file). Subsequent to pre-processing, the data is stored in the data storage and interchange layer 350.

(b) Model(s) run. The desired climate impact and hazard model is run (or models in case of model calibration or ensemble), pulling the data inputs from the data storage and interchange layer 350, and returning the results from the climate impact and hazard model(s) back to the data storage and interchange layer 350.

(c) Data post-processing. Post-processing of the data follows the post-processing steps that the user indicated in the workflow specification file. The results are then returned to the data storage and interchange layer 350, where they may be presented to the user.

Figure 4:
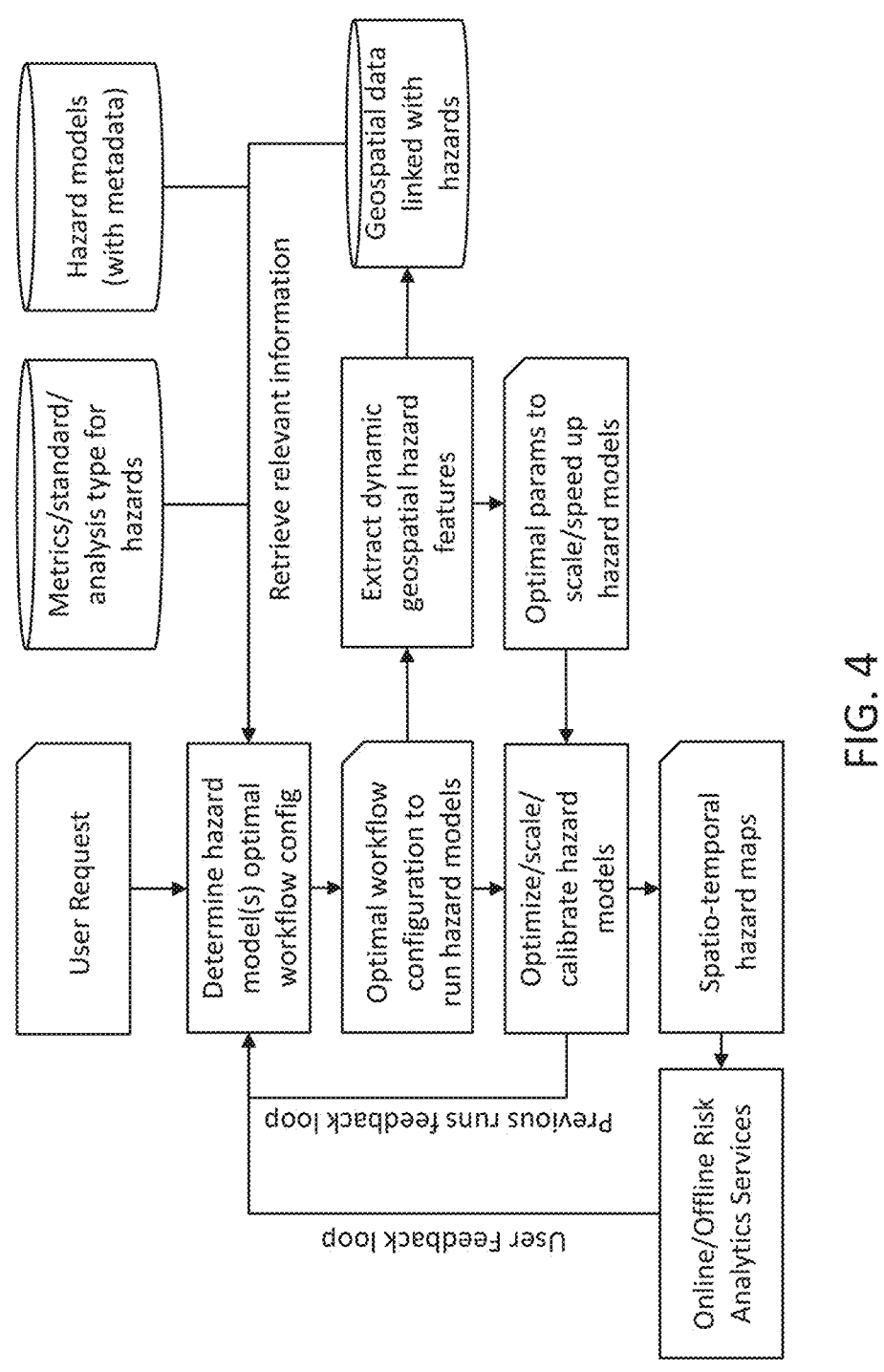
FIG. 4 is a block diagram of overall functionalities of a system, according to an embodiment of the invention.
Figure 5:
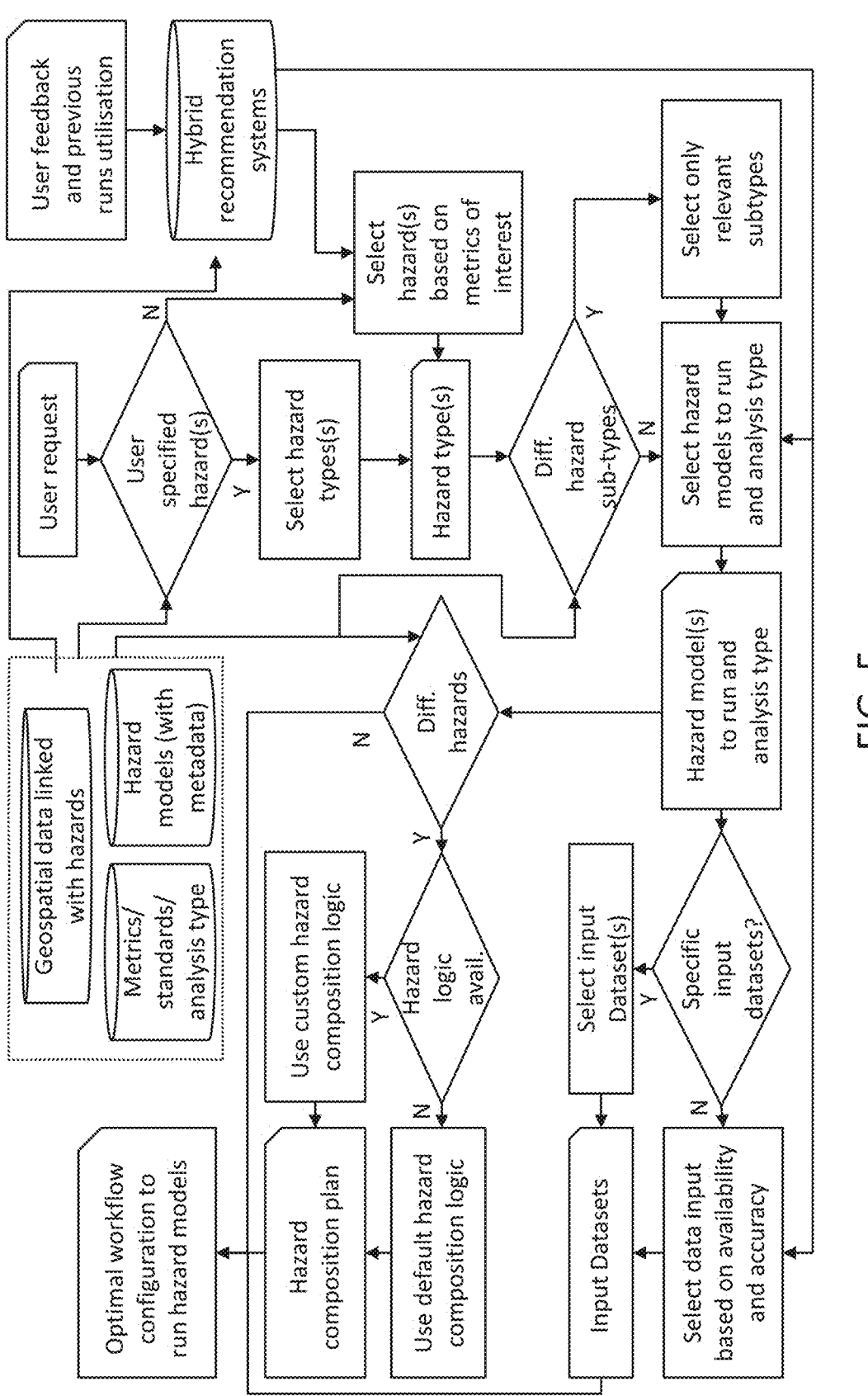
FIG. 5 is a block diagram of a method for dynamically determining optimal workflow configurations for climate impact and hazard models, according to an aspect of the invention.
Figure 6:
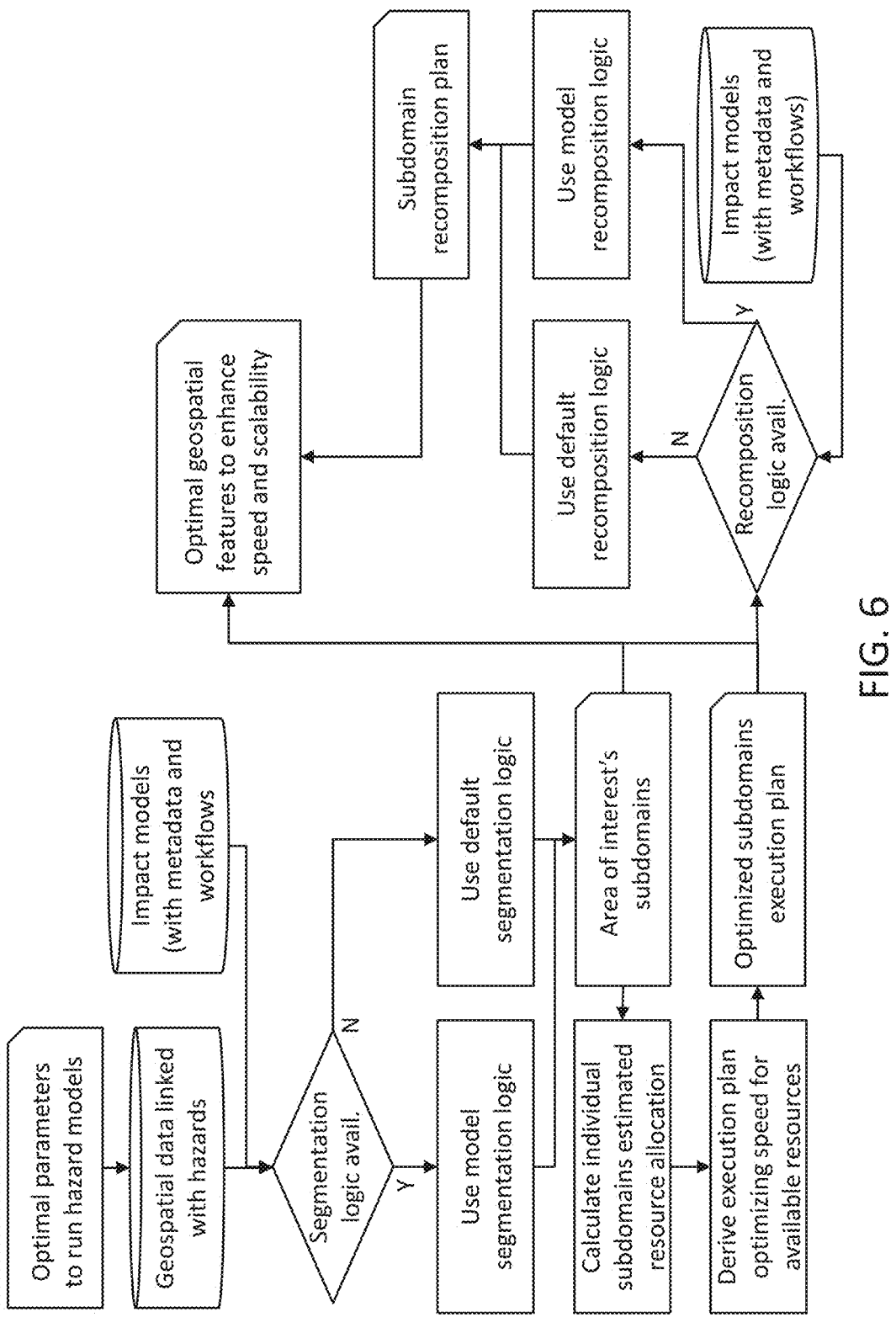
FIG. 6 is a block diagram of a method for dynamically determining optimal workflow configurations for climate impact and hazard models, according to an aspect of the invention.
Figure 7:
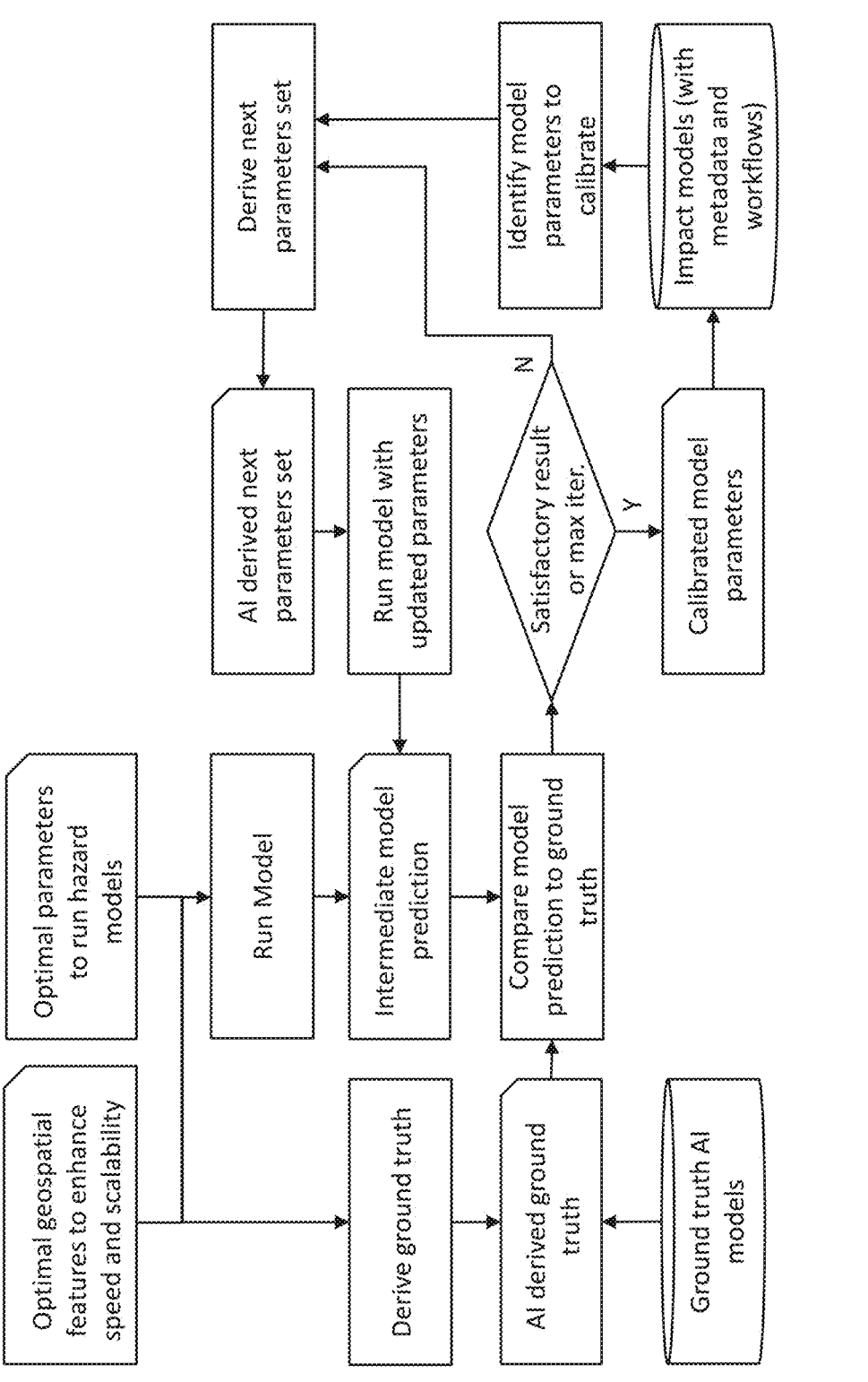
FIG. 7 is a block diagram of a method for extracting dynamic geospatial hazard features to enhance speed and scalability, according to an aspect of the invention.

FIG. 4 presents an overview of system functionalities according to an embodiment of the present invention. Explanations of individual steps portrayed in FIG. 4 are explained below, in reference to FIGS. 5-7

According to aspects of embodiments of the invention there is provided a means for dynamically determining a climate impact and hazard models optimal intelligent workflow configurations. This is presented graphically in FIG. 5.

Specifically, starting from a user request, hybrid recommendation systems are used, which combine knowledge graphs and machine learning/artificial intelligence models. As such, the optimal intelligent workflow configuration for the climate impact and hazard models is dynamically determined. The knowledge graphs contain the relationship between the different type of hazards and impacts, their subtypes, impact and hazard metrics, and input datasets. The knowledge graphs are used as a starting point to implement a rule-based selection of the optimal intelligent workflow configurations, while AI models (e.g., deep learning embedding) are used to refine and improve and/or personalize the intelligent workflow recommendations. The process to select the optimal intelligent workflow configuration is composed of four steps:

1. A hazard/impact of interest is selected by a user. For example, if the user is interested in impacts/hazards impacting the power grid, then the user is going to initially select from the knowledge graph for the hazards and impacts associated with the user's interest, a metric for the area of interest (e.g., flood and landslide flood). This may be an iterative process, which is learned through multiple iterations (e.g., it may be discovered that wildfires are another hazard associated with a given hazard and/or geographic area). This may be achieved via deep learning embedding, which progressively substitutes recommendations by the knowledge graphs.

2. Once the impact/hazard types are identified, the relevant impact/hazard subtypes are selected based on the spatial and temporal user requirements. For example, for a flood hazard pluvial, fluvial and coastal flooding may be sub-types of interest. Relevant sub-types are automatically selected based on the geospatial requirements (e.g., the presence of a coast, for coastal flooding). Subsequent to selecting impact impact/hazard types and subtypes, relevant climate impact and hazard models are selected.

3. If the user did not specify the input datasets, relevant input datasets are selected to use for the specific climate impact and hazard models, analysis and geographical area.

4. If multiple climate impact and hazard models are selected, embodiments check whether there is a specific logic on how to compose the output of the models (i.e., a mode of the output of the models). If the specific logic for composing the output is not available, a default output mode is used (e.g., risk compounding).

According to further aspects of embodiments of the invention, there is provided a means for extracting parameters of a climate impact and hazard models based on dynamic geospatial hazard features to enhance speed and scalability. Optimal model parameters are dynamically derived, in order to enhance scalability and speed and is represented by the bloc diagram of FIG. 6.

Each climate impact and hazard model typically has an associated segmentation logic that breaks down the area of interest in subdomains (e.g., for floods this may be certain flood basins). If no specific segmentation logic is present, then a default one is used.

Based on previous climate impact and hazard model runs, an estimation of the necessary resources to run each subdomain are calculated, in combination with constraints provided either by the user (e.g., max resources used or max time) or the system itself. This may produce an optimized sub-domain execution plan.

Each climate impact and hazard model also has an associated decomposition logic that merges the resulting altered subdomains.

According to additional aspects of embodiments of the invention there is provided a means for improving the quality of climate impact and hazard models. One such embodiment is presented in FIG. 7. in which model improvement is achieved by learning the joint distribution of climate driver, and climate impact and hazard model uncertainty.

In the case of joint distribution learning, each climate impact and hazard model has an associated AI model (e.g., deep learning model trained on satellite data from historical events, such as from EU Copernicus) that derives ground truth data for the specific impact/hazard modelled by the climate impact and hazard model. For example, providing the flood or wildfire extent for a specific event in the past in a specific area of interest. The ground truth is derived in parallel to the first run of the climate impact and hazard model in order to save time.

The first intermediate results are compared to the AI-derived ground truth data, when available. The system may use the most appropriate metric (e.g., dice index for segmentation or root mean square error (RMSE) for numerical predictions) to check whether the result is satisfactory. If it is not, the system identifies the parameters that are relevant to the climate impact and hazard model for the specific spatial domain (e.g., soil type actually present in the specific area of interest for which the model has a relevant parameter to calibrate). These parameters are the ones that are used in an iterative calibration process that uses AI (e.g., Bayesian Operation) to speed up the exploration of the parameter space. Each time a new value for a model parameter is selected, the climate impact and hazard model is run again, and further model parameters are identified for modification.

Once the chosen metric indicates that the result is satisfactory, the calibrated parameters and their distribution collected during the iterative calibration process are then saved for future forecasting runs, as starting point for further calibration, or for assessing model uncertainty (e.g., using the parameter distribution).

Figure 8:
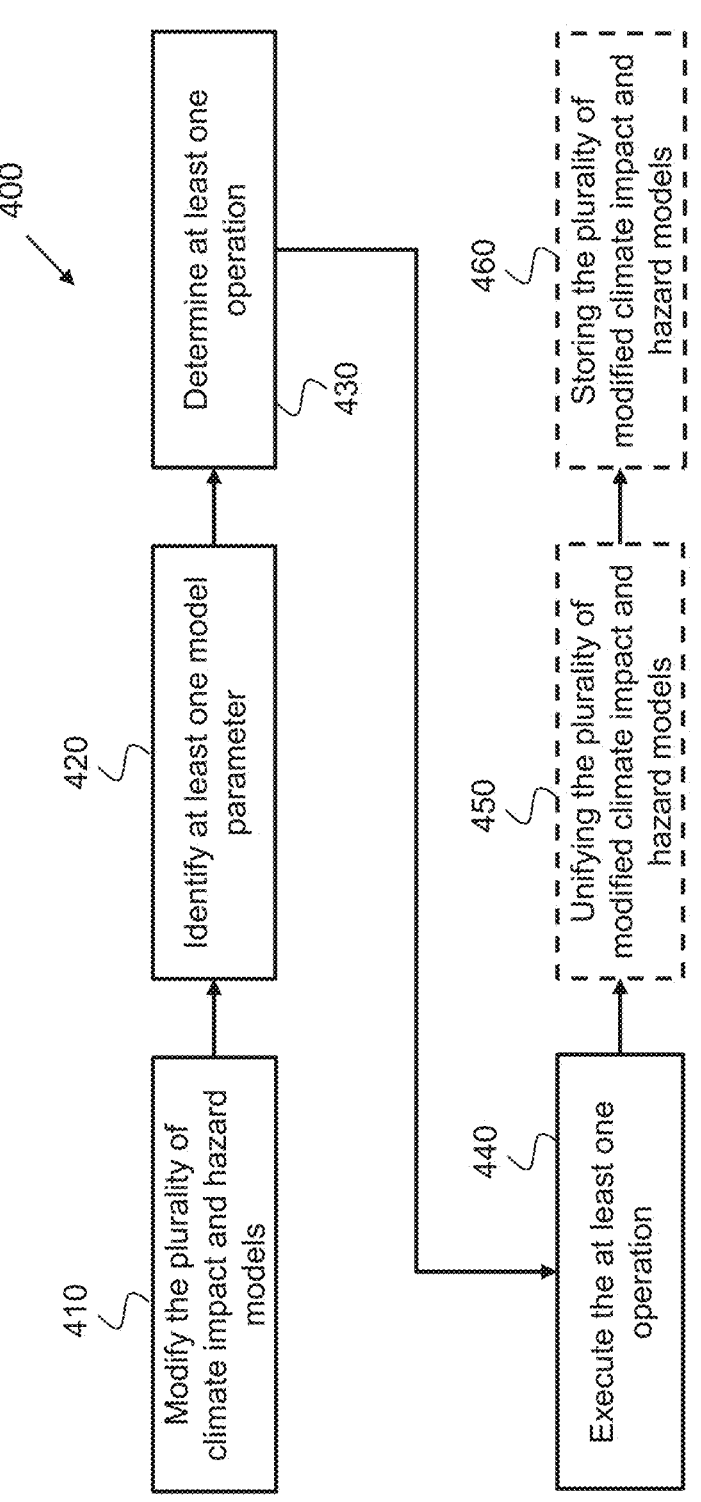
FIG. 8 is a flow diagram of a method for dynamically calibrating model parameters to enhance accuracy, scalability and speed according to an embodiment of the invention.

Turning to FIG. 8, there is presented a method 400 for augmenting a plurality of climate impact and hazard models.

At step 410, the plurality of climate impact and hazard models are modified based on a user-specified requirement and at least one intelligent workflow.

In some embodiments, the plurality of climate impact and hazard models may include at least one of: flooding models, wildfire models, drought models, rainfall models, heat wave models, and cold wave models. However, the climate impact and hazard models are not restricted to these and may be any model which takes into account climate-related factors. Each of the plurality of models may be of any type, for example they may be probability based, AI-based, etc. Each of the plurality of models may be configured to accept a number of inputs (i.e., a time frame, a geographical location, climate input data, etc.), and output a prediction.

Furthermore, the user-specified requirement may include at least one of: a geographical location, a time period, and a modelled hazard. The user-specified requirement may indicate the answer to a question that the user wishes to obtain from the framework including the plurality climate impact and hazard models.

Moreover, a workflow is a sequence of processes from initiation to completion. In this context an intelligent (i.e., AI-enabled) workflow is a sequence of processes for augmentation of the climate impact and hazard models. The workflow is intelligent as it may be configured to adapt to the individual climate impact and hazard model, and the type of modification that is to be performed, so that augmentation may be handled appropriately and efficiently.

Modifying the plurality of climate impact and hazard models may comprise at least one of onboarding, managing, and scaling each of the plurality of climate impact and hazard models based on the user-specified requirement and the at least one intelligent workflow. The operations may be performed in any manner known in the art. The intelligent workflow may adapt to the mode of modification. The user-specified requirement may further specify the type of modification to take place.

Onboarding the plurality of climate impact and hazard models comprises generating and providing geospatial data interfaces, pre-processing, post-processing, and validation tools.

Overall, the step of modifying the plurality of climate impact and hazard models may deliver modified climate impact and hazard models in line with user-requirements. Indeed, the plurality of climate impact and hazard models may be modified based on an intelligent workflow automatically or manually chosen.

At step 420, at least one model parameter associated with the modified climate impact and hazard model is identified, by processing the modified climate impact and hazard model with a model enhancing machine learning algorithm. Step 420 is performed for each of the modified plurality of climate impact and hazard models.

The model enhancing machine learning algorithm may be adapted to identify parameters of the modified climate impact and hazard model that may improve efficiency, speed, and/or accuracy of the model. As such, the model enhancing machine learning algorithm may receive a modified climate impact and hazard model as input and may output an identified/determined parameter of the modified climate impact and hazard model which may be key to improving the model.

In some cases, identifying the at least one model parameter associated with the modified climate impact and hazard model is further based on ontologies and knowledge graphs corresponding to the modified climate impact and hazard model. The additional basis of ontologies and knowledge graphs may provide more information to aid in the identification of the at least one model parameter.

At step 430, at least one operation is determined based on the user-specified requirement, the at least one intelligent workflow, and the at least one model parameter corresponding to the modified climate impact and hazard model. Step 430 is performed for each of the plurality of modified climate impact and hazard models.

After identifying at least one model parameter (the modification of which may improve the climate impact and hazard model), an operation is identified based on the identified model parameter. The operation is further based on the user-specified requirement and the intelligent workflow, such that an appropriate operation may be identified for both the user and the climate change and impact model.

More specifically, the operation may include at least one of: model calibration (i.e., parameter/process modification), uncertainty quantification (i.e., a level of confidence in the predictions of the model), model validation (i.e., ensuring the model outputs are close to the ground truth), localization (i.e., adaptation of the model to user-requirements), and scaling (i.e., changing the geographic, temporal, etc. focus of the model) of the modified climate impact and hazard model.

At step 440, the at least one operation corresponding to the modified climate impact and hazard model is executed based on the at least one intelligent workflow. Step 440 is also performed for each of the plurality of modified climate impact and hazard models.

Accordingly, the modified climate impact and hazard model is augmented, so that it may be more accurate, faster, and/or more efficient.

When the operation includes model calibration, executing the operation comprises: generating a ground truth (target), based on inputting test data to a ground truth machine learning model; generating a predicted output, based on inputting the test data to the modified climate impact and hazard model; and adapting parameters of the modified climate impact and hazard model, based on a comparison between the ground truth and predicted output.

A ground truth machine learning model may be used in order to obtain a target for the modified climate impact and hazard model, so that when compared to the actual output, a difference may be determined. From the difference, the model may be calibrated (by adapting parameters of the model) using known methods to narrow the difference between the ground truth (target) and the output.

When the operation includes uncertainty quantification, executing the operation comprises learning a joint distribution that includes data input to the modified climate impact and hazard model, and an uncertainty of the modified climate impact and hazard model.

An uncertainty of the modified climate impact and hazard model may be known, which may be useful for a user in assessing confidence in the models' outputs.

When the operation includes model validation, executing the operation comprises validating the modified climate impact and hazard model, based on the user-specified requirement.

When the operation includes scaling, executing the operation comprises adapting parameters of the modified climate impact and hazard model, based on the user-specified requirement.

Validation and scaling are important to deliver a modified climate impact and hazard model which meets user requirements.

At (optional) step 450, the plurality of modified climate impact and hazard models are unified.

In this way, the plurality of modified climate impact and hazard models may be utilized together. By diversifying the climate impact and hazard models, a wide spread of possible real-world outcomes may be reflected in the output of the unified climate impact and hazard models.

At (optional) step 460, the plurality of modified climate impact and hazard models are stored on a hybrid cloud environment.

Depending on the needs of the user, storing the modified climate impact and hazard models on a hybrid cloud environment may be useful for future access to the modified climate impact and hazard models.

In particular, storing the plurality of modified climate impact and hazard models may comprise managing, consolidating, versioning, and benchmarking each of the plurality of modified climate impact and hazard models.

It should be noted that one, both, or neither of steps 450 and 460 may be included in the method 400, depending on needs of the user.

Figure 9:
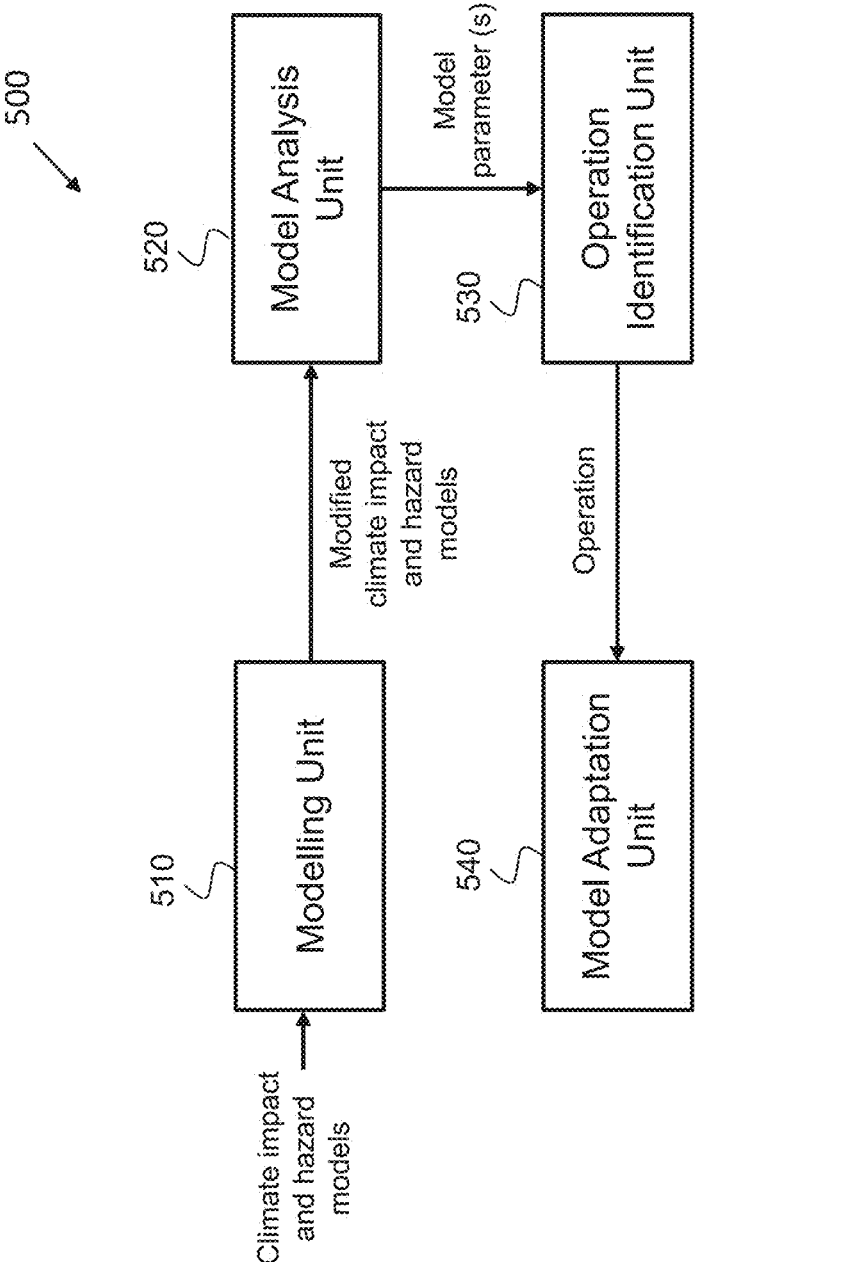
FIG. 9 is a simplified block diagram of a system for augmenting a plurality of climate impact and hazard models according to a further embodiment of the invention.

FIG. 9 depicts a system 500 for augmenting a plurality of climate impact and hazard models. The system 500 comprises a modelling unit 510, a model analysis unit 520, an operation identification unit 530, and a model adaptation unit 540.

The modelling unit 510 is configured to modify the plurality of climate impact and hazard models based on a user-specified requirement and at least one intelligent workflow.

The modelling unit may be configured to receive the plurality of climate impact and hazard models (i.e., from a database, or user input), and modify such climate impact and hazard models. Thus, the modelling unit may adapt the plurality of climate impact and hazard models to better fit the user-specified requirement (i.e., a specified geography, a hazard to be modelled, etc.), and output the modified climate impact and hazard models to the model analysis unit 520.

The model analysis unit 520 is configured to identify, for each of the plurality of modified climate impact and hazard models, at least one model parameter associated with the modified climate impact and hazard model, by processing the modified climate impact and hazard model with a model enhancing machine learning algorithm.

The model enhancing machine learning algorithm may be stored locally or may be loaded when required. The machine learning algorithm may be adapted to analyze the parameter space of the modified climate impact and hazard model and determine parameters of the climate impact and hazard model that may improve the model.

The operation identification unit 530 is configured to determine, for each of the plurality of modified climate impact and hazard models, at least one operation based on the user-specified requirement, the at least one intelligent workflow, and the at least one model parameter corresponding to the modified climate impact and hazard model.

Accordingly, an operation (e.g., model calibration, uncertainty quantification, model validation, localization, scaling etc.) for improving/better understanding the modified climate impact and hazard model may be identified.

The model adaptation unit 540 is configured to execute, for each of the plurality of modified climate impact and hazard models, the at least one operation corresponding to the modified climate impact and hazard model based on the at least one intelligent workflow.

Furthermore, it is understood in advance that although this disclosure includes a detailed description on cloud computing, implementation of the techniques recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. The cloud model may include at least five characteristics, at least three service models, and at least four deployment models.

Characteristics of the cloud model are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 10:
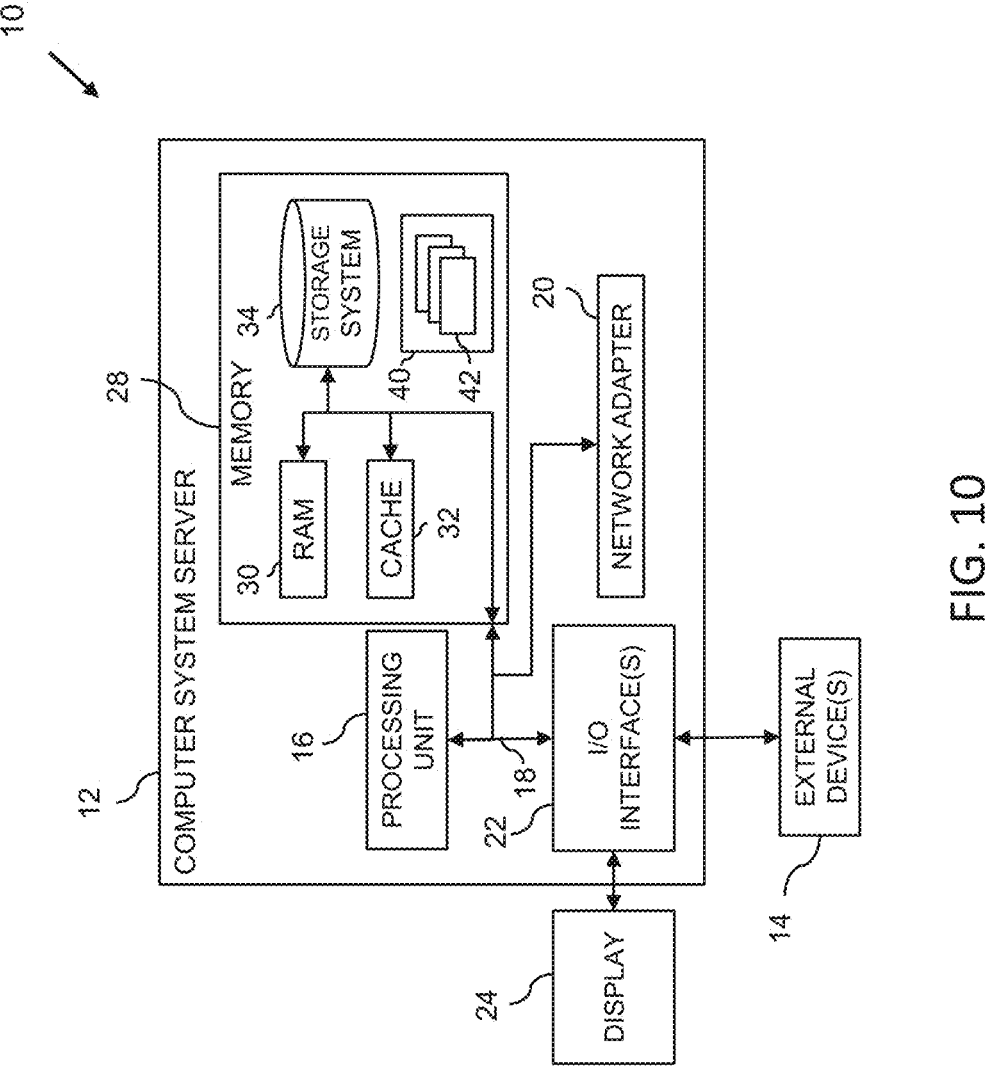
FIG. 10 depicts a cloud computing node according to an embodiment of the present invention.

Referring now to FIG. 10, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment.

Program modules 42 generally carry out the functions and/or methodologies of embodiments of the invention as described herein. For example, some or all of the functions of a climate impact and hazard model operating on computer system/server 12 can be implemented as one or more of the program modules 42. Additionally, computer system/server 12 may be implemented as including separate dedicated processors or a single or several processors to provide the functionality described herein. In embodiments, the computer system/server performs one or more of the processes described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID (redundant array of inexpensive disks or redundant array of independent disks) systems, tape drives, and data archival storage systems, etc.

Figure 11:
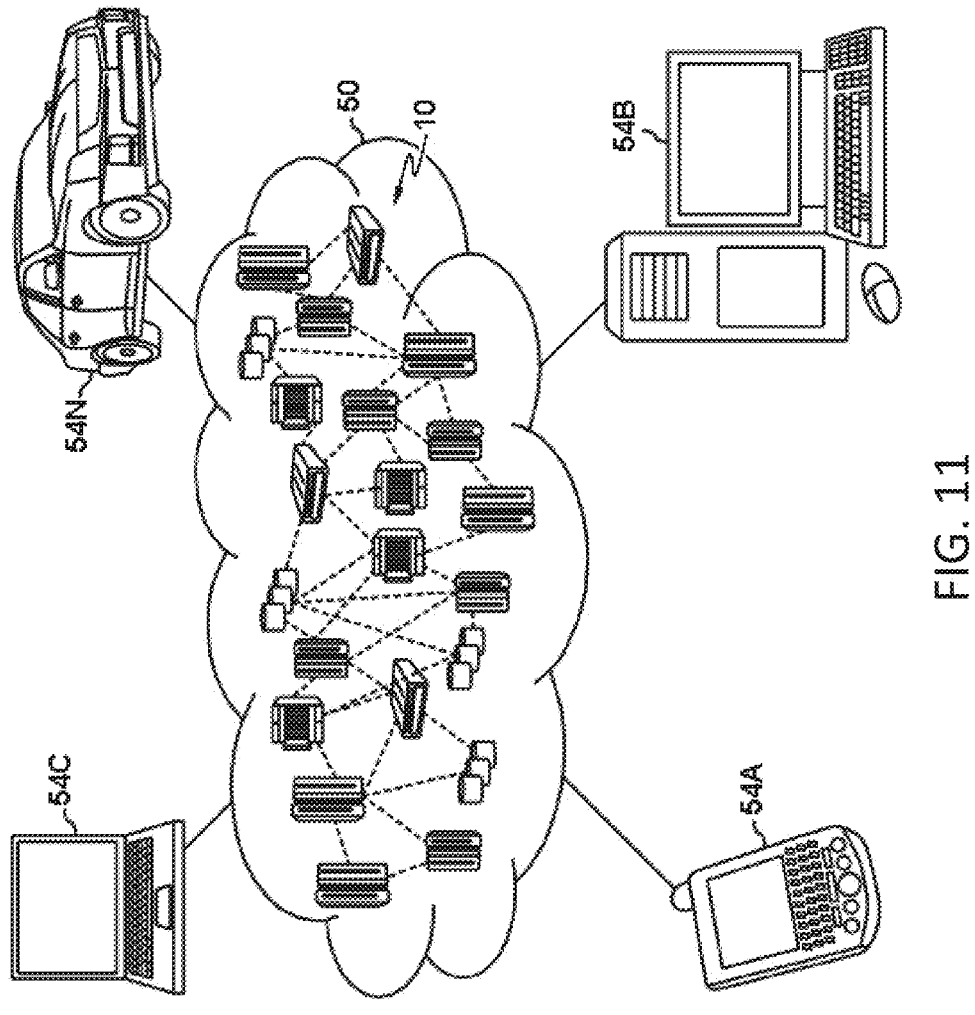
FIG. 11 depicts a cloud computing environment according to embodiments of the present invention.

Referring now to FIG. 11, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Figure 12:
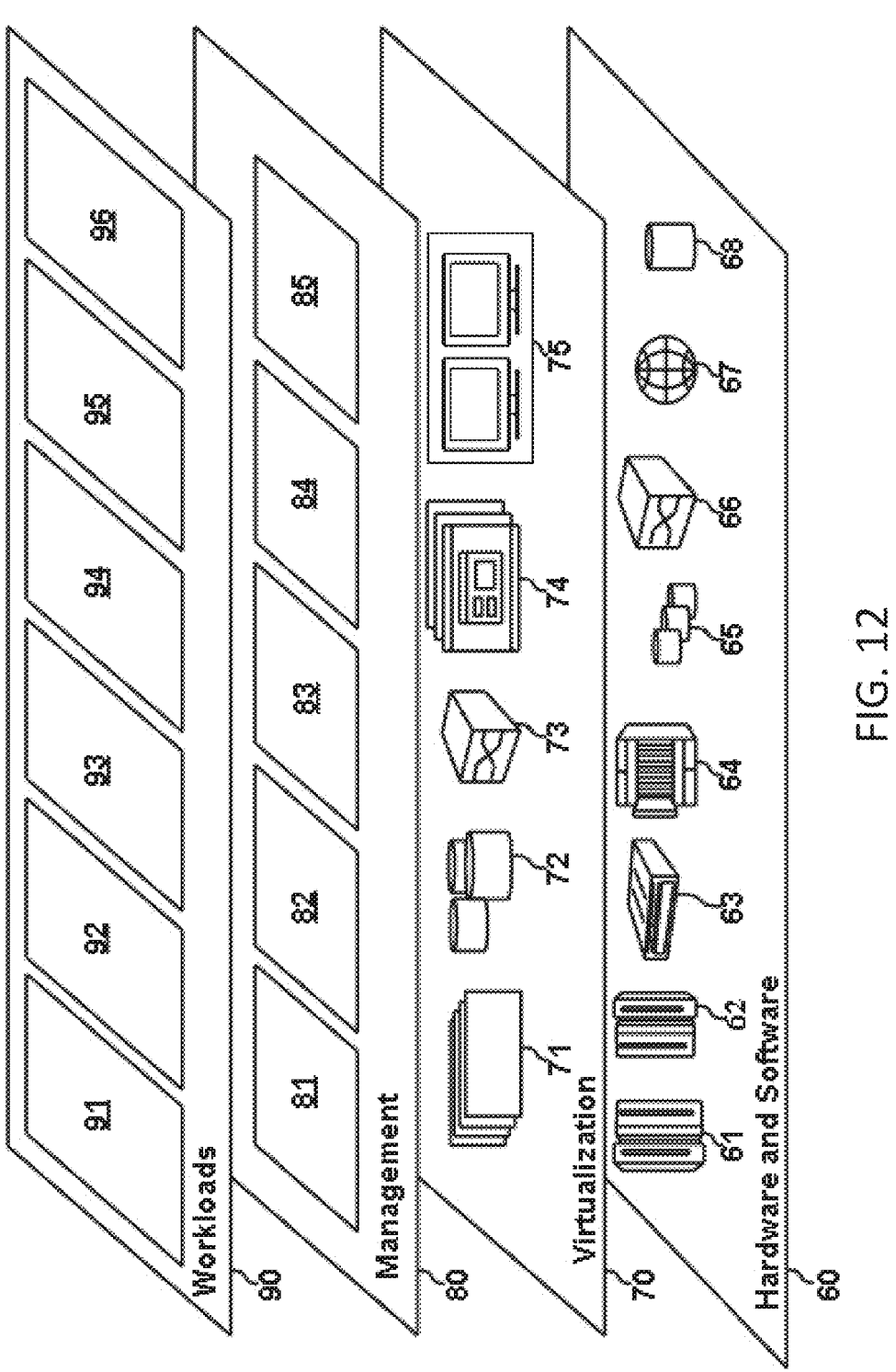
FIG. 12 depicts abstraction model layers according to embodiments of the present invention.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture-based servers 62; servers 63; blade servers 64; storage device 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Real-time security processes 85 provide control over execution of events.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing and model augmentation 96. In accordance with aspects of the invention, the model augmentation function may perform methods related to augmenting a plurality of climate impact and hazard models.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The mere fact that certain measures are recited in mutually different dependent claims does not indicate that a combination of these measures cannot be used to advantage.

Any reference signs in the claims should not be construed as limiting the scope.

What is claimed is:

1. A computer-implemented method for augmenting a plurality of climate impact and hazard models, the method comprising:

modifying, by one or more processors, the plurality of climate impact and hazard models based on a user-specified requirement and at least one intelligent workflow of intelligent workflows, wherein modifying the plurality of climate impact and hazard models comprises at least one selected from a group consisting of: onboarding, managing, and scaling each of the plurality of climate impact and hazard models based on the user-specified requirement and the at least one intelligent workflow and wherein a framework for the intelligent workflows comprises a plurality of framework components and wherein the plurality of framework components includes an API (application programming interface), a workflow specification layer, data and model ontology, workflow orchestration layer, model validation layer, data storage and interchange layer, workflow run and data sources and wherein the intelligent workflows are a sequence of processes for augmentation of the climate impact and hazard models and the intelligent workflows can be configured to adapt to the climate impact and hazard models and type of modification that is to be performed;

identifying, by the one or more processors, for each of the modified plurality of climate impact and hazard models, at least one model parameter associated with a respective modified climate impact and hazard model, by processing the respective modified climate impact and hazard model with a model enhancing machine learning model;

determining, by the one or more processors, for each of the modified plurality of climate impact and hazard models, at least one operation based on the user-specified requirement, the at least one intelligent workflow, and the at least one model parameter corresponding to the respective modified climate impact and hazard model; and executing, by the one or more processors, for each of the modified plurality of climate impact and hazard models, the at least one operation corresponding to the respective modified climate impact and hazard model, based on the at least one intelligent workflow.

2. The computer-implemented method of claim 1, further comprising unifying the modified plurality of climate impact and hazard models.

3. The method of claim 1, wherein modifying the plurality of climate impact and hazard models includes onboarding each of the plurality of climate impact and hazard models by generating and providing geospatial data interfaces, pre-processing, post-processing, and validation tools.

4. The computer-implemented method of claim 1, further comprising storing the modified plurality of climate impact and hazard models on a hybrid cloud environment.

5. The computer-implemented method of claim 4, further comprising:

storing, by the one or more processors, the modified plurality of climate impact and hazard models, wherein storing the modified plurality of climate impact and hazard models includes managing, consolidating, versioning, and benchmarking each of the modified plurality of climate impact and hazard models.

6. The computer-implemented method of claim 1, wherein identifying the at least one model parameter associated with the respective modified climate impact and hazard model is further based on ontologies and knowledge graphs corresponding to the respective modified climate impact and hazard model.

7. The computer-implemented method of claim 1, wherein the at least one operation includes at least one selected from the group consisting of: model calibration, uncertainty quantification, model validation, localization and scaling of the modified plurality of climate impact and hazard model.

8. The computer-implemented method of claim 1, wherein the at least one operation includes model calibration, and executing the operation comprises:

generating, by the one or more processors, a ground truth test data;

inputting, by the one or more processors, the ground truth test data to a ground truth machine learning model;

generating, by the one or more processors, a predicted output, based on inputting the ground truth test data to the modified plurality of climate impact and hazard model; and adapting, by the one or more processors, parameters of the modified plurality of climate impact and hazard model based on a comparison between the ground truth machine learning model and predicted output.

9. The computer-implemented method of claim 1, wherein the at least one operation includes uncertainty quantification, and executing the at least one operation comprises learning a joint distribution of data input to the modified climate impact and hazard model, and uncertainty of the modified climate impact and hazard model.

10. The computer-implemented method of claim 1, wherein the at least one operation includes model validation, and executing the at least one operation comprises: validating the modified plurality of climate impact and hazard model based on the user-specified requirement.

11. The computer-implemented method of claim 1, wherein the at least one operation includes scaling, and executing the at least one operation includes adapting the at least one model parameter of the modified plurality of climate impact and hazard model based on the user-specified requirement.

12. The computer-implemented method of claim 1, wherein the modified plurality of climate impact and hazard models includes at least one selected from a group consisting of: flooding models, wildfire models, drought models, rainfall models, heat wave models, and cold wave models.

13. The computer-implemented method of claim 1, wherein the user-specified requirement includes at least one selected from a group consisting of: a geographical location, a time period, and a modelled hazard.

14. A computer system for augmenting a plurality of climate impact and hazard models, the system comprising:
  one or more computer processors;
  at least one computer-readable storage medium, and program instructions stored on the at least on computer readable storage medium, the computer system further comprising:
    a modelling unit configured with program instructions to modify the plurality of climate impact and hazard models based on a user-specified requirement and at least one intelligent workflow of intelligent workflows, wherein modifying the plurality of climate impact and hazard models comprises at least one selected from a group consisting of: onboarding, managing, and scaling each of the plurality of climate impact and hazard models based on the user-specified requirement and the at least one intelligent workflow and
      wherein a framework for the intelligent workflows comprises a plurality of framework components and wherein the plurality of framework components includes an API (application programming interface), a workflow specification layer, data and model ontology, workflow orchestration layer, model validation layer, data storage and interchange layer, workflow run and data sources and
    wherein the intelligent workflows is a sequence of processes for augmentation of the plurality climate impact and hazard models and the intelligent workflows can be configured to adapt to the plurality climate impact and hazard models and type of modification that is to be performed;
    a model analysis unit configured with program instructions to identify, for each of the modified plurality of climate impact and hazard models, at least one model parameter associated with a respective modified climate impact and hazard model, by processing the respective modified climate impact and hazard model with a model enhancing machine learning model;
    an operation identification unit configured with program instructions to determine, for each of the modified plurality of climate impact and hazard models, at least one operation based on the user-specified requirement, the at least one intelligent workflow, and the at least one model parameter corresponding to the respective modified climate impact and hazard model; and
    a model adaptation unit configured with program instructions to execute, for each of the modified plurality of climate impact and hazard models, the at least one operation corresponding to the respective modified climate impact and hazard model, based on the at least one intelligent workflow.

15. The computer system of claim 14, wherein modifying the plurality of climate impact and hazard models includes onboarding each of the modified plurality of climate impact and hazard models by generating geospatial data interfaces, and providing pre-processing, post-processing, and validation tools.

16. The computer system of claim 14, further comprising:
  storing, by the one or more processors, the modified plurality of climate impact and hazard models, wherein storing the modified plurality of climate impact and hazard models includes managing, consolidating, versioning, and benchmarking each of the modified plurality of climate impact and hazard models.

17. The computer system of claim 14, wherein identifying the at least one model parameter associated with the respective modified climate impact and hazard model is further based on ontologies and knowledge graphs corresponding to the respective modified climate impact and hazard model.

18. The computer system of claim 14, wherein the at least one operation includes at least one selected from the group consisting of: model calibration, uncertainty quantification, model validation, localization and scaling of the modified plurality of climate impact and hazard model.

19. The computer system of claim 14, wherein the at least one operation includes model calibration, and executing the operation comprises:
  program instructions to generate a ground truth test data;
  program instructions to input the ground truth test data to a ground truth machine learning model;
  program instructions to generate a predicted output, based on inputting the ground truth test data to the modified plurality of climate impact and hazard model; and
  program instructions to adapt the at least one parameter of the respective modified climate impact and hazard model, based on a comparison between the ground truth machine learning model and predicted output.

* * * * *